Aug. 21, 1962 J. SCHLUCHTER 3,050,047
AUTOMATIC MACHINE FOR THE DRILLING OF A SUCCESSION
OF BORES IN PARTS MADE OF HARD MATERIAL
Filed Aug. 12, 1960 17 Sheets-Sheet 1
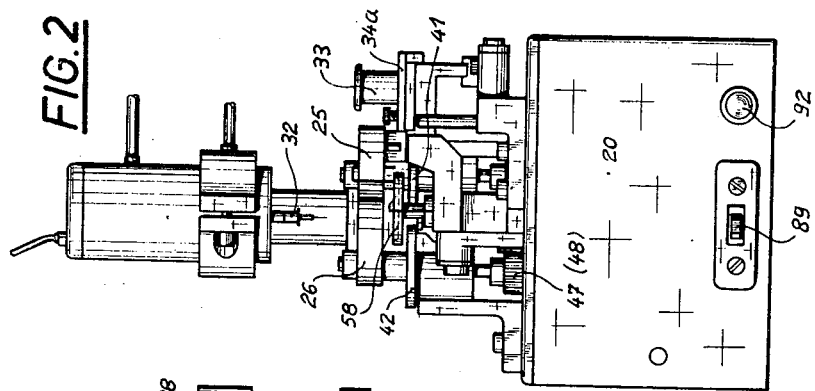
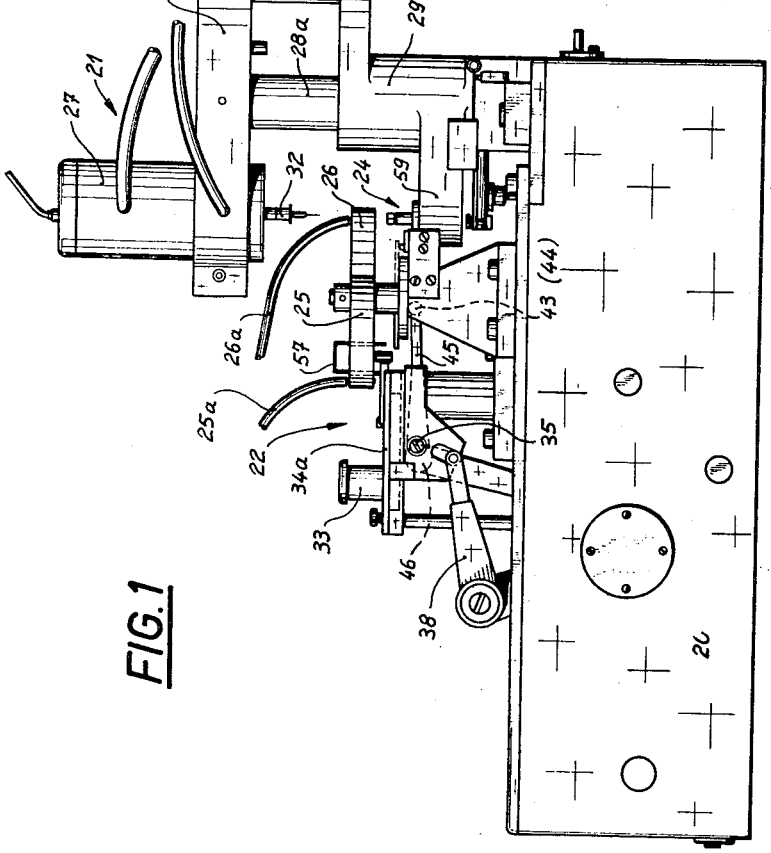

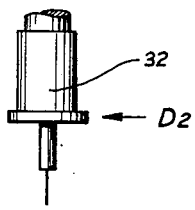
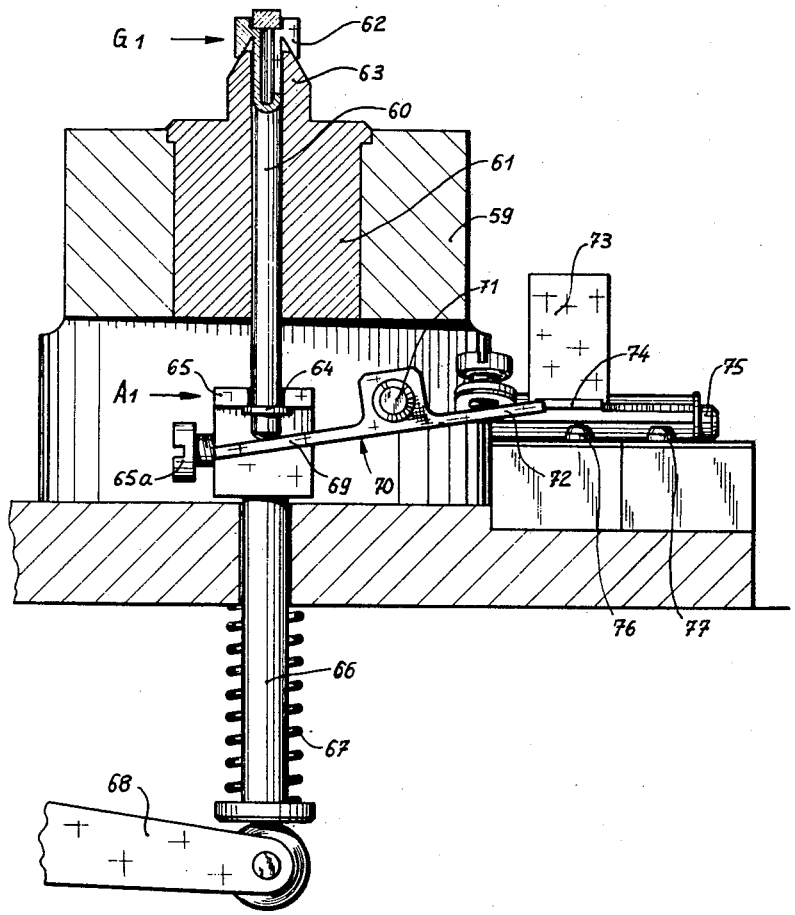
FIG.5

Aug. 21, 1962 J. SCHLUCHTER 3,050,047
AUTOMATIC MACHINE FOR THE DRILLING OF A SUCCESSION
OF BORES IN PARTS MADE OF HARD MATERIAL
Filed Aug. 12, 1960 17 Sheets-Sheet 6

Aug. 21, 1962   J. SCHLUCHTER   3,050,047
AUTOMATIC MACHINE FOR THE DRILLING OF A SUCCESSION
OF BORES IN PARTS MADE OF HARD MATERIAL
Filed Aug. 12, 1960   17 Sheets-Sheet 11

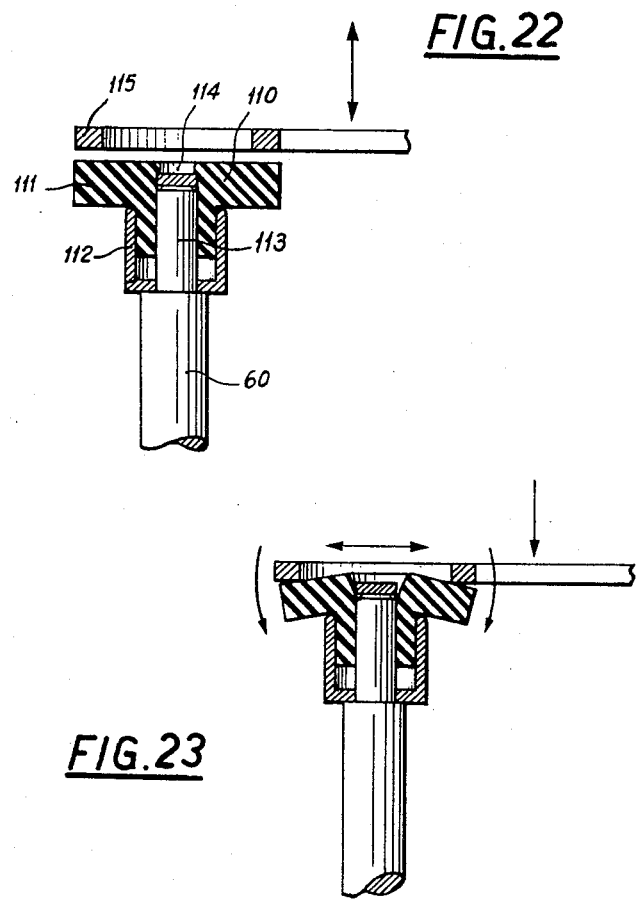

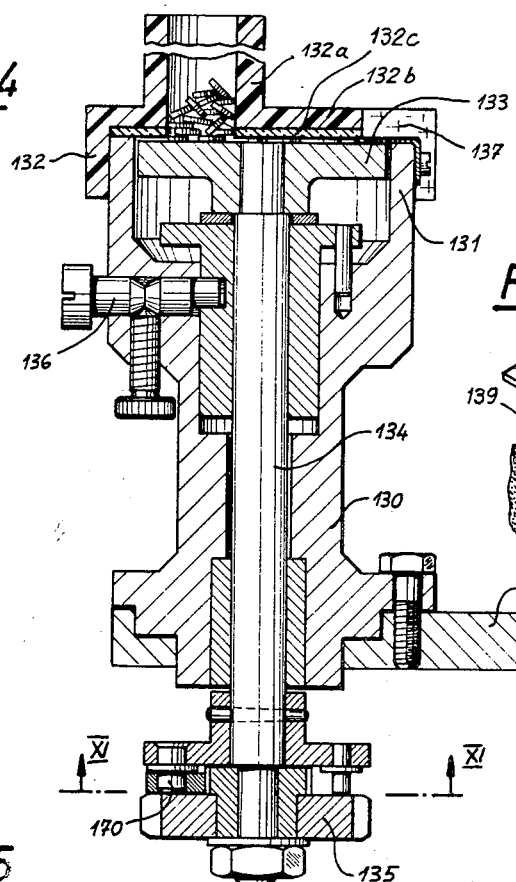
FIG.24
FIG.25
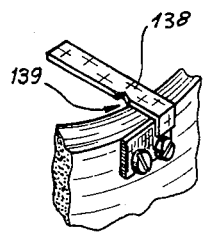
FIG.27
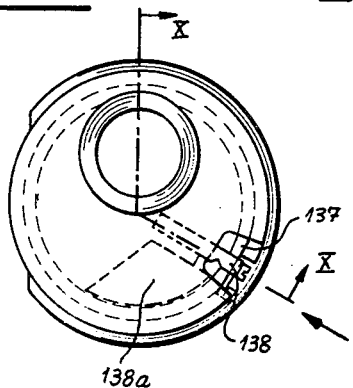
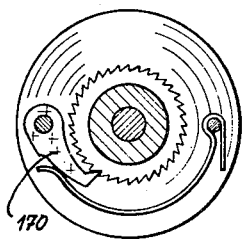
FIG.26

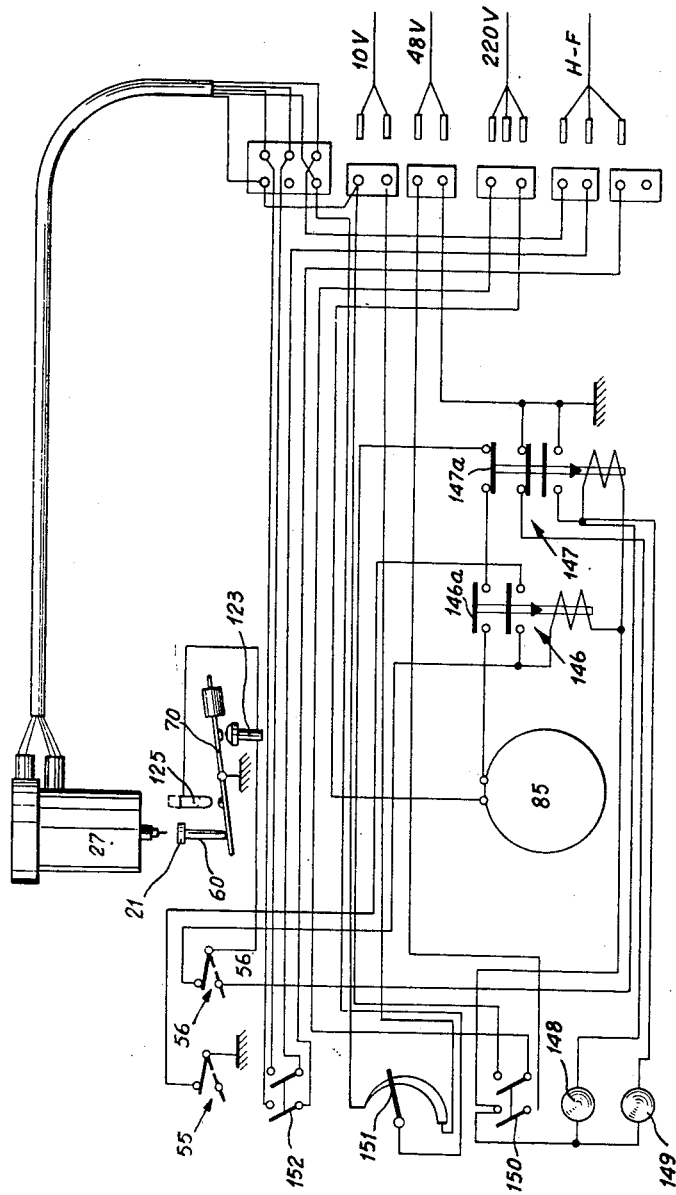

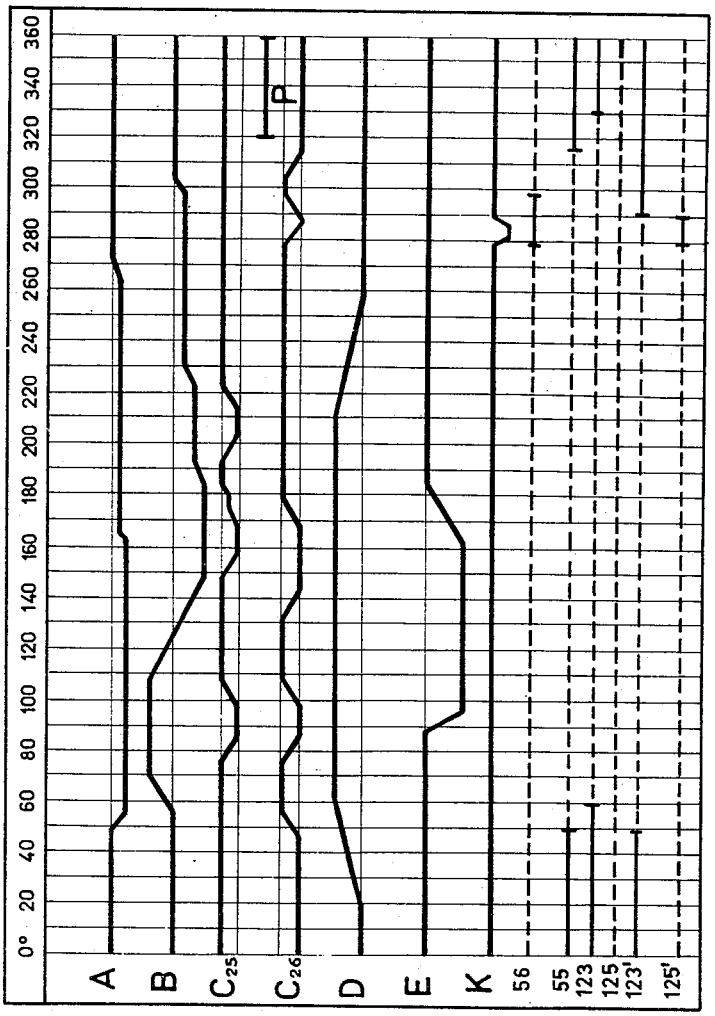

United States Patent Office 3,050,047
Patented Aug. 21, 1962

3,050,047
AUTOMATIC MACHINE FOR THE DRILLING OF A SUCCESSION OF BORES IN PARTS MADE OF HARD MATERIAL
Jean Schluchter, Geneva, Switzerland, assignor to Indufi S.A. de Participations, Geneva, Switzerland, a firm of Switzerland
Filed Aug. 12, 1960, Ser. No. 49,293
Claims priority, application Switzerland Aug. 17, 1959
20 Claims. (Cl. 125—30)

The present invention, has for its object an automatic machine for the drilling of a succession of bores in parts made of hard material.

According to said invention, there is provided a magazine for the parts to be drilled or perforated, a drilling mechanism with a vertical spindle, clamping means in which the parts are held fast during the drilling operation, a conveyor system, a container collecting the parts when drilled and a mechanism adjusting and timing the movements of the movable members of the machine, so that the latter may execute a succession of operative cycles, during each of which one of the parts to be drilled is conveyed from the supply to the clamping means, while the precedingly drilled part is being conveyed from the clamping means to the collecting container.

The accompanying drawing illustrates, by way of example and in a non-binding sense, two embodiments of a machine according to the invention, intended for the boring of clockwork jewels.

FIGS. 1 to 15 relate to the first embodiment, and
FIGS. 16 to 29, to the second embodiment.

More specifically, FIG. 1 is a lateral elevational view of the first embodiment.

FIG. 2 is a front elevational view.

FIG. 5 is a partial sectional view through the axis of the spindle.

Figure 16:
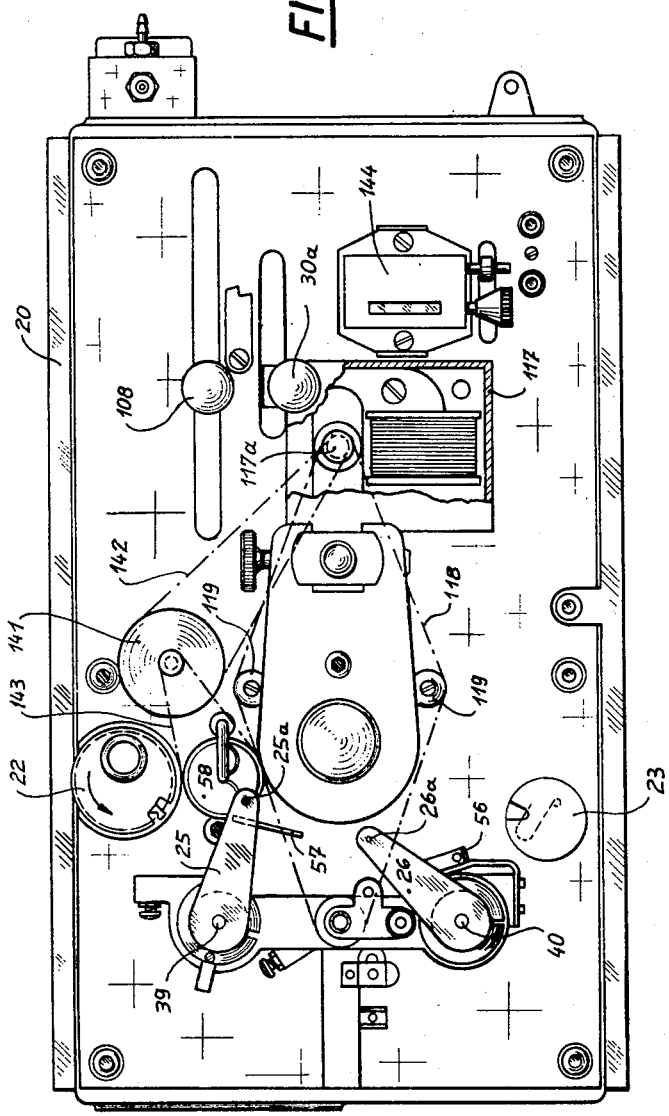

As to the second embodiment, FIG. 16 is a plan view thereof.

Figure 17:
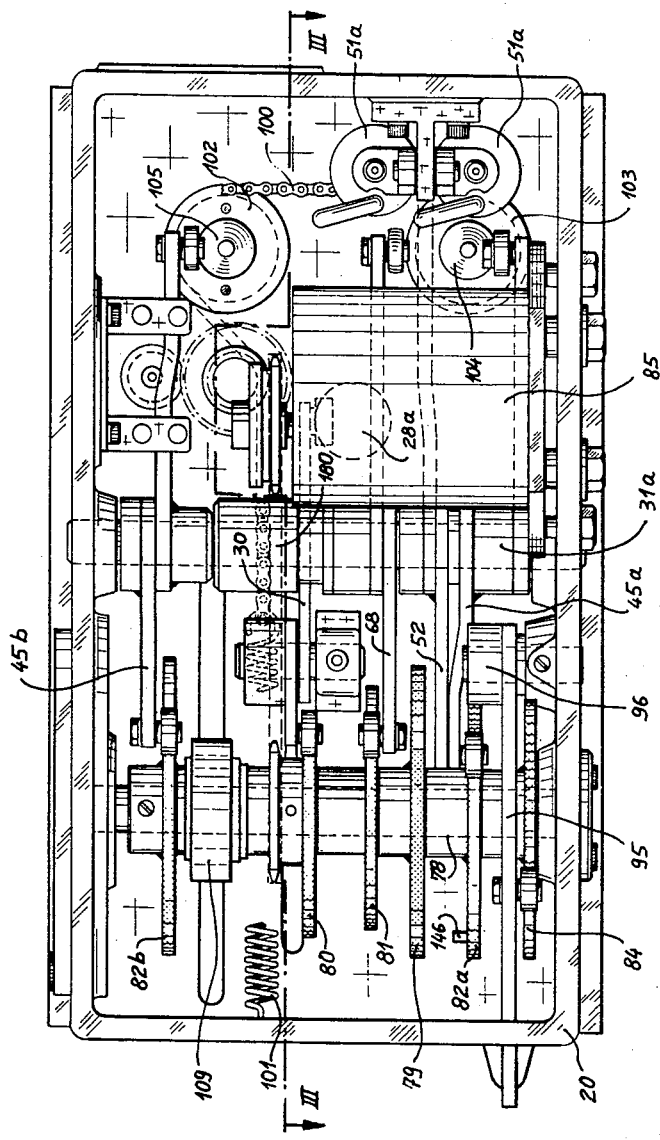

FIG. 17 is a view from below of said second embodiment.

Figure 18:
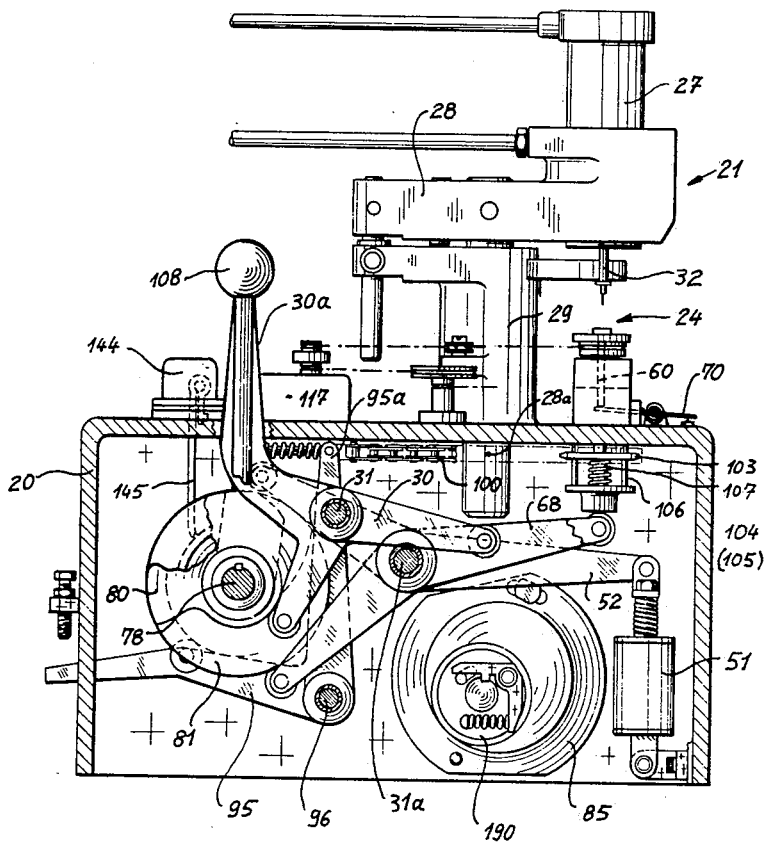

FIG. 18 is a sectional view through line XVIII—XVIII of FIG. 17.

Figure 19:
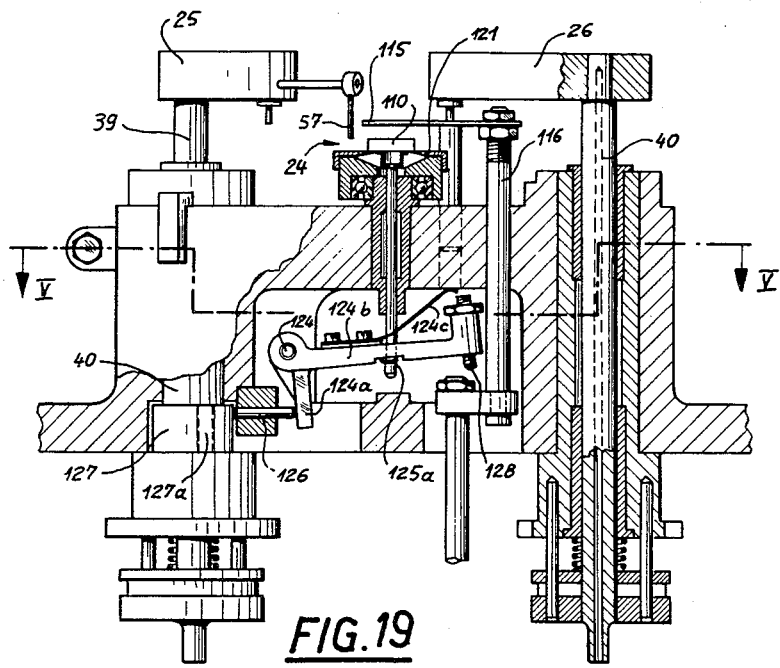

FIG. 19 is a sectional view, on a larger scale, through line XIX—XIX of FIG. 16, showing the details of the mechanism controlling the clamping means.

Figure 20:
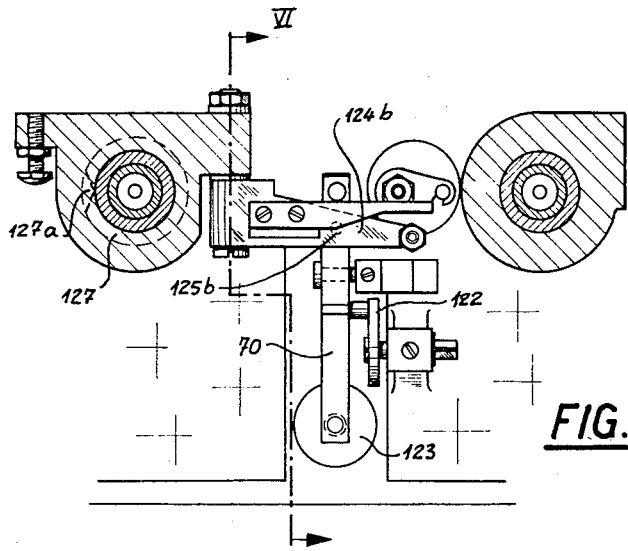
Figure 21:
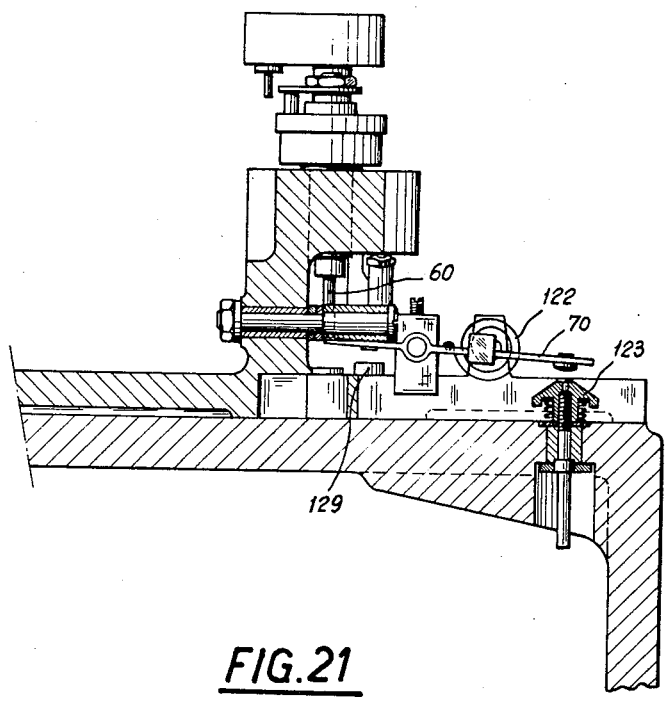

FIGS. 20 and 21 are sectional views through lines XX—XX and XXI—XXI of FIG. 19.

FIGS. 22 and 23 are axial sectional views, on a larger scale, illustrating the operation of the clamping means.

FIG. 24 is a sectional axial view of the magazine carrying the supply of parts.

FIGS. 25 and 26 are sectional views through lines XXV—XXV and XXVI—XXVI of FIG. 24.

FIG. 27 is a sectional view of a detail seen in the direction of the arrow of FIG. 25.

FIG. 28 is a wiring diagram and
FIG. 29 is a chart illustrating the operation of said second embodiment.

Figure 3:
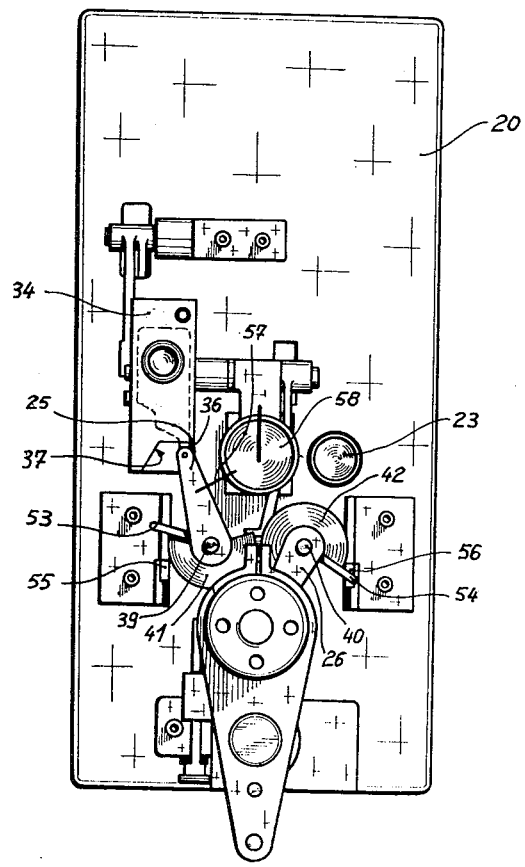
FIG. 3 is a plan view.
Figure 4:
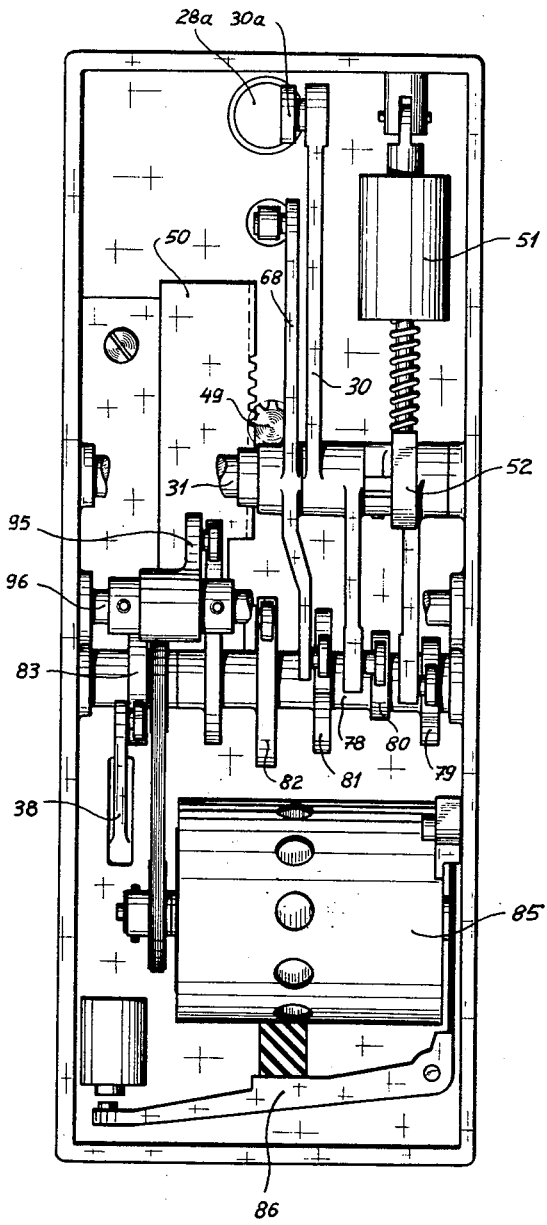
FIG. 4 is a view from below of said first embodiment.

Turning to FIGS. 1 to 15 and, more particularly, to FIGS. 1 to 3, the first embodiment of the improved machine includes a frame 20, a drilling mechanism 21 having a vertical axis, a magazine 22 carrying the stones of jewels to be drilled, a collecting container 23 for the drilled stones, clamping means 24 for holding the stones during the drilling operation, a conveying system including two arms 25 and 26 removing at the same moment for each cycle of operation of the machine, respectively, a stone to be drilled out of the magazine 22 and a drilled stone out of the clamping means 24, the first-mentioned arm setting the stone to be drilled between the jaws of said clamping means and the second arm bringing the drilled stone above the container 23.

The headstock 27 of the drilling mechanism is carried by a support 28 rigid with a piston 28a sliding vertically inside an upright 29. Said piston 28 is carried freely by the roller 30a pivotally mounted at the end of a lever 30 (FIG. 4) pivotally secured to a spindle 31. During operation of the machine, said lever 30 transmits to the piston 28a and, consequently, to the headstock 27, a vertical reciprocation. The spindle 32 of the drilling mechanism is driven into rotation by an independent high frequency motor housed within the headstock.

The magazine 22 is formed by a cylinder 33 open at its upper end and into which the stones to be drilled are fed in lump formation, said cylinder being rigid with the cover 34a of a rectangular casing 34 pivotally secured to a spindle 35. The spacing between the lower surface of the cover 34a and the bottom of said casing is slightly larger than the height of any of the stones, so that the latter can enter the casing only in a flat and horizontal position. The longitudinal walls of the casing converge at one of the ends of said casing, so as to form a channel 36, the breadth of which is equal to that of a stone, said channel leading to a point of the cover 34a at which a notch 37 is formed. The stone magazine is controlled by a mechanism including a lever 38 imparting to it a rocking movement round the spindle 35, so that the stones carried inside the casing 34 may collect in a row inside the channel 36, the first stone in the row thus formed appearing to view in the notch 37 forming the output port for the magazine.

Two arms 25 and 26 of the conveying means are mounted respectively on two vertical shafts 39 and 40 (FIG. 3) which carry each a segment 41 and 42 resting respectively on the rollers 43 and 44 revolvably mounted on a lever 45 pivotally secured at 46. To the lower ends of said vertical shafts 39 and 40 are keyed two pinions 47 and 48 meshing both with the same pinion 49 (FIG. 4) meshing in its turn with a rack 50 controlled by a lever 95 pivotally secured to a spindle 96.

The levers 45 and 95 are adapted to make the arms 25 and 26 move along closed paths corresponding to the movements of the stones to be conveyed. The stone-securing means on said arms are constituted by the openings of two pipes 25a and 26a passing through the ends of said arms 25 and 26 and communicating with the cylinder of a pump 51 (FIG. 4), the piston of which is connected with a lever 52 pivotally secured to the spindle 31. Said lever produces periodically and in synchronism with the movement of the arms a delivery and a suction of air through the pipes 25a and 26a.

The arms 25 and 26 carry furthermore two projections 53 and 54 adapted to actuate for each cycle of operation of the machine miniature switches 55 and 56 respectively (FIG. 3), the part played by which will be disclosed hereinafter. The arm 25 carries furthermore a strap 57, of which one arm is adapted to dip at timed moments and by equal amounts at each cycle of operation of the machine into an abrading and lubricating solution contained inside a container 58 and to convey a drop of said substance onto the stone to be drilled, which latter is held by the clamping means 24.

The clamping means 24 include, as shown in FIG. 5, a vertical rod 60 sliding axially in a guiding sleeve 61 carried by a tube 59 formed in one with the upright 29. The upper end of said rod 60 is shaped so as to form three elastic jaws 62 which are spaced apart by a frusto-conical blade 63 on the sleeve 61 when said rod is drawn downwardly. Said rod carries at its lower end a small collar 64 adapted to cooperate with a fork 65 removably secured by a screw 65a to the upper end of a tie 66 passing through the frame of the machine. Said tie 66 is subjected, on the one hand, to the permanent action of a spring 67 which urges it downwardly and, on the other hand, to the intermittent action of a lever 68 pivotally secured to the spindle 31, the resultant of said two actions constraining the tie to execute vertical movements to be described hereinafter.

The lower end of the rod 60 is furthermore in permanent contact with the arm 69 of a rocker 70 pivotally secured at 71 and of which the second arm 72 is subjected to an adjustable force which urges the rod 60 upwardly. Said force is that produced by the weight of a slider 73 carried by a blade 74 pivotally secured at 75 and engaging the arm 72. The rocking movement of said blade is limited in a downward direction by two miniature switches 76 and 77 which are actuated when the blade engages them under the action of its weight and of the weight of the slider.

The movements of the different movable parts described up to now are controlled and adjusted by a shaft 78 carrying six cams 79 to 84 and driven by an electric motor 85 associated with an electromagnetic brake 86. The cams 79, 80 and 81 cooperate with the levers 52, 30 and 68 which control respectively, as already mentioned, the movement of the piston of the pump 51, the vertical reciprocations of the headstock 27 and those of the tie 66.

The cam 82 adjusts the rocking movement of the lever controlling the rise of the segments 41 and 42, while the cam 83 controls the lever 38 of the mechanism rocking the stone magazine 22. Lastly, the cam 84 cooperates with the lever 95 controlling the movement of the rack 50.

Figure 6:
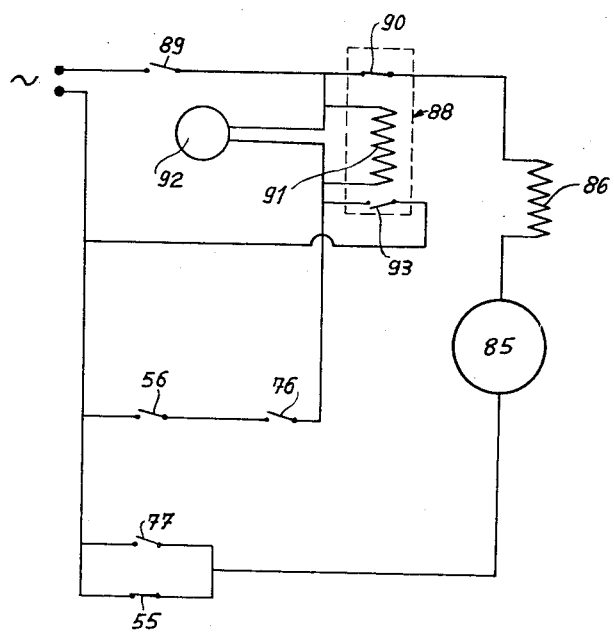
FIG. 6 is a diagram of the electric section of the machine.
Figure 7:
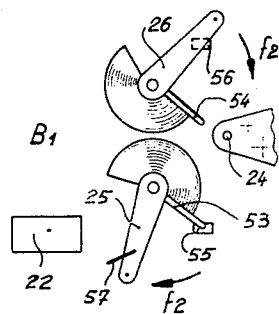
FIGS. 7 to 11 are diagrammatic plan views showing different angular positions in which the arms of the conveying system stop during one cycle of the machine.
Figure 8:
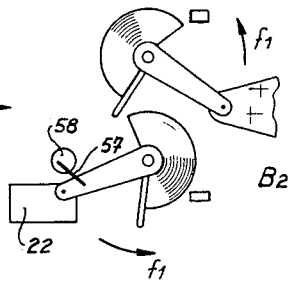
Figure 9:
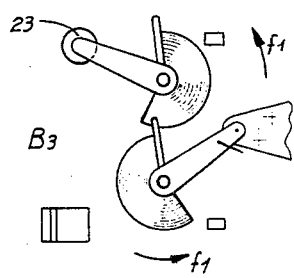
Figure 10:
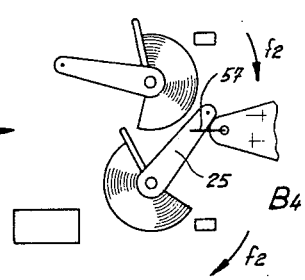

The electric section of the machine is constituted, as shown in FIG. 6, by a circuit feeding the motor 85 and by an alarm circuit. Said two circuits are inserted in parallel with the mains and are interconnected by a relay 88. The feed circuit includes a main switch 89, the winding of the braking electromagnet 86, the miniature switches 55 and 77 in parallel relationship and the main switch 90 controlled by the relay 88. The alarm circuit includes the miniature switches 56 and 76 inserted in series, a witness lamp 92 and the winding 91 of the relay 88 inserted in parallel with said lamp and a switch 93 holding the relay 88 in a self-energized condition. FIG. 6 shows the switches in their inoperative condition. The main switch 89 and the witness lamp 92 are inserted in the front wall of the frame of the machine, as shown in FIG. 2.

Figure 15:
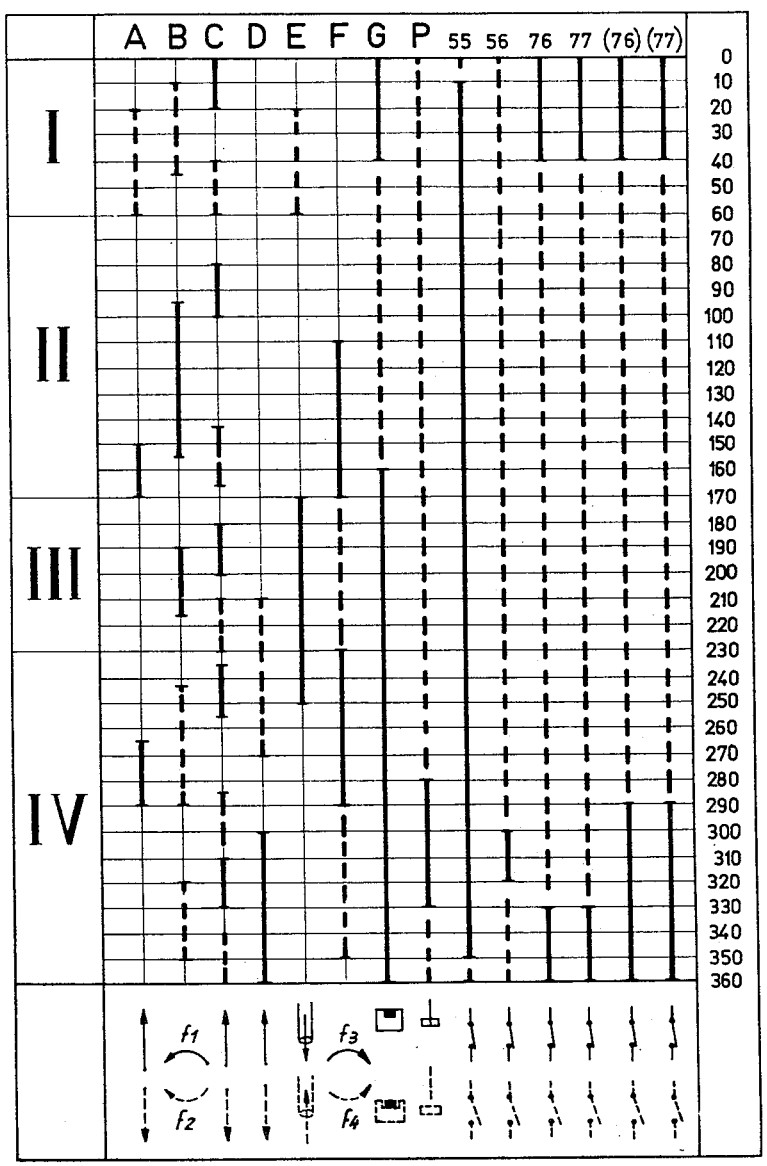
FIG. 15 is a chart illustrating the operation of the machine as a whole.

The operation of the machine is illustrated graphically on the chart of FIG. 15. In said chart which corresponds to one cycle of operation, i.e. to one revolution of the camshaft 78, the letters A, B, C, D, E, F, G, P designate respectively:

A the vertical movements of the fork 65,

B and C the horizontal pivotal movements and the vertical movements of the conveying means 25—26 respectively, D the vertical movements of the spindle 32, E the suction and delivery periods in the pipes 25a and 26a, F the rocking movements of the magazine 22, G the closed and open conditions of the clamping means 24, P the drilling periods.

The numerals 55—56—76—77 correspond to the switches designated by said reference numbers in the drawings.

At the lower end of the chart of FIG. 15 are illustrated diagrammatically the meanings of the solid and interrupted lines showing directions of movement or conditions of certain members.

In order to simplify the explanation of the operation, the operative cycle has been subdivided into four stages I, II, III, IV, corresponding in succession to the engagement of the stones by the arms, to the discharge of the stones, to the laying of the abrading material and to the perforation. The beginning and the end of each of said stages register, in the case illustrated, with the angular settings of the conveying arms for which the latter stop transiently; these positions, illustrated in FIGS. 7 to 10, will be designated hereinafter by the letters B1, B2, B3, and B4.

Figure 12:
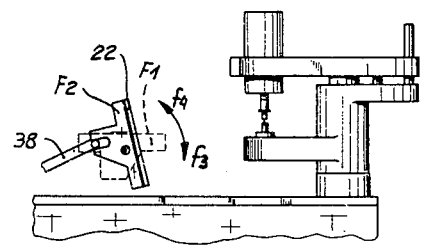
FIG. 12 is a partial diagrammatic elevational view illustrating the movement of the magazine.
Figure 13:
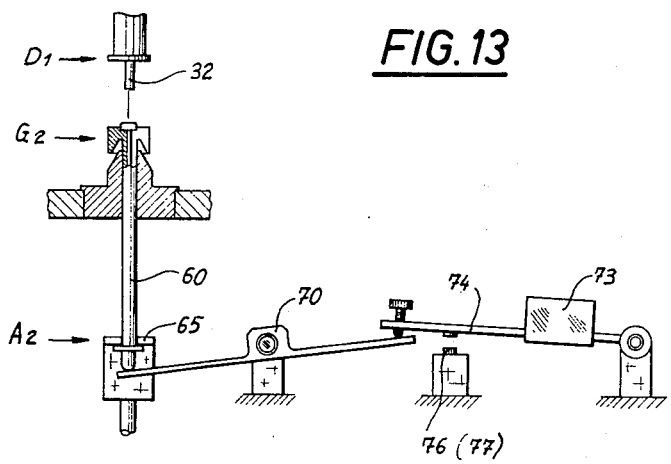
FIGS. 13 and 14 are partial diagrammatic elevational views illustrating the operation of the clamping means.

FIG. 12 illustrates the conveying arms 25 and 26 in the intermediate angular position B5 in which said arms stop transiently during the last stage of each cycle. Furthermore, the positions in which the other movable members stop transiently are designated by letters associated each with an index which also designates the movement considered in the chart of FIG. 15.

Lastly, the cycle to be described now is not the starting cycle, but a normal cycle. It should be therefore assumed that an already perforated stone is carried by the clamping means 24 at the moment at which the cycle starts, while the switch 89 is closed.

Stage I.—Clamping of the Stones

Figure 14:
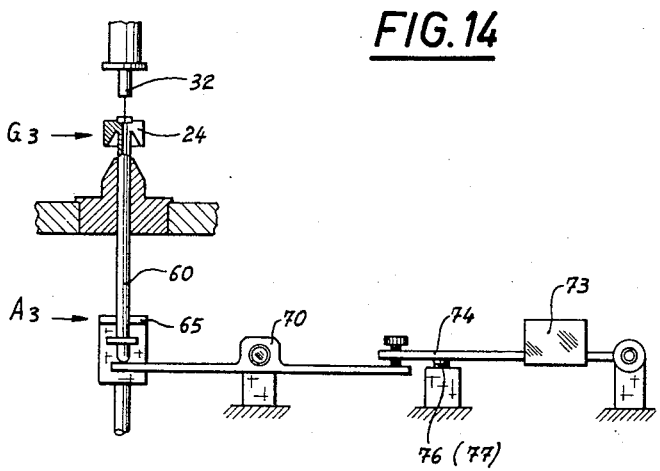

At the beginning of this first stage corresponding to zero angular shifting of the camshaft 78, the arms 25 and 26 are in a position B1 (FIG. 7) and in their lower position designated hereinafter by the reference G1, so that the arm 26 opens the miniature switch 55 through the finger 53. The spindle 32 is completely raised and occupies the position D2 (FIG. 5), while the fork 65 is in its raised position A3 (FIG. 14). The rod 60 is urged by the weight 73 into its uppermost position illustrated in FIG. 14 at G3, while the clamping means 24 and the switches 76 and 77 are closed.

The motor 85 is fed from the mains through the closed switches 77, 89 and 90. In contradistinction, the alarm circuit is not energized, the switch 56 being open. During said stage, the arms 25 and 26 are shifted angularly in the direction of the arrow f2 into the angular position B2 and they execute a vertical reciprocation between their lower positions at G1 and their upper positions at G2. The fork 65 moves from its upper position A3 to its lower position A1 (FIG. 5) upon movement of the rod 60 towards its lower position (FIG. 5). During this movement, the clamping means 24 and the miniature switches 76 and 77 open, the clamping means being in their lower position G1. The motor 25 is fed, however, without the opening of the switch 77 opening its circuit, since, in the meantime, the miniature switch 55 has been released with reference to the finger 53 and has closed. The stone to be drilled and the drilled stone are subjected to suction and are held in position thereby, while the free arm of the strap 57 enters the abrading solution. During the first stage, thus described, the magazine is held fast in its position F1 (FIG. 12).

Stage II.—Release of the Stones

During said second stage, the arms 25 and 26 begin rising into their position G2 and pivot in the direction of the arrow f1 into their angular position B3 (FIG. 9) and sink then back into the position G1. The stone to be drilled is then introduced into the clamping means 24. During the last-described movement of the arms 25 and 26, the fork 65 rises into an intermediate position A2 (FIG. 13) followed by the rod 60 which is raised by the rocker 70. Said movement of the rod 60 allows the jaws 62 to close over the stone to be drilled. At this moment, the air is delivered into the pipes 25a and 26a and the drilled stone drops into the collecting container 23. Said second stage does not modify the condition of the switches, but the magazine has rocked forwardly in the direction f3 into the position F2 (FIG. 12).

*Stage III.—Application of the Abrasive Solution*

During this third stage, the arms 25 and 26 continue moving angularly in the direction of the arrow f1, until they reach the angular position B4 (FIG. 10) and they execute a vertical reciprocation between the positions G1 and G2. At the end of said movement, the free arm of the strap 52 applies, over the upper surface of the stone to be drilled, a drop of the abrasive solution.

During this time, the fork 65 has remained in its intermediation position A2 and the condition of the switches has not been modified. In contradistinction, at the end of this stage, the spindle 32 has begun sinking into its position D1 (FIG. 13) and the drill has begun its movement towards the stone to be drilled. Lastly, the magazine 22 has returned into its starting position through a pivotal movement in the direction of the arrow f4 (FIG. 12).

*Stage IV—Drilling*

Figure 11:
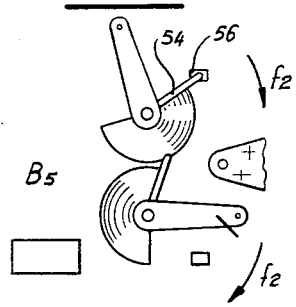

During this last stage, which is more intricate than the first three stages, the arms 25 and 26 are shifted angularly from the position B4 (FIG. 10) to the position B1 (FIG. 7), their rotation being executed in the direction of the arrow f2 with a stopping in the intermediate position B5 (FIG. 11). They rise first into the position G2, after which they execute a reciprocation between the positions G2 and G1 with a short stopping at G1 at the moment of the interruption of their angular movement in said intermediate position B5, during which the finger 54 closes the switch 56 and, finally, said arms return into their position G1 for which the finger 53 closes the switch 55

At the beginning of said fourth stage, the spindle 32 finishes its downward movement and the drilling starts at the moment at which the drill is in the immediate vicinity of the stone to be drilled (FIG. 13), as provided by the sudden rising movement of the fork 65 into its upper position A3 (FIG. 14). This has for its result a release of the rod 60 which, being subjected to the sole action of the weight 73, rises and urges the stone to be drilled against the drill which executes the desired drilling.

This movement of the rod 60, the speed of which depends on the pressure exerted by the stone to be drilled on the drill, on the hardness of the material to be drilled, on the features of the drill and on the angular speed of the spindle 52, continues at a comparatively low speed until the drill has passed entirely through the spindle; at this moment, the rod 60, the fork 65, the rocker 70 and the blade 74 are in the positions illustrated in FIG. 14. The switches 76 and 77 close. During normal operation, their closing has no action on the alarm circuit, since the switch 56 is now open after a transient closing by the finger 54.

At the end of the drilling stage during which the magazine 22 has rocked again between its position F1 and F2, the spindle 32 rises into its upper position D2.

Control of the conditions of the drill and of the presence of a stone in the clamping means:

If the drill is broken or no stone is held by the clamping means 24 at the moment at which the latter rise starting from the position G2 towards the position G3 under the action of the weight 73 during the fourth stage, the machine stops automatically. As a matter of fact, the rod 60 meets no hindrance and rises more quickly than under normal conditions and this leads to an early closing of the switches 76 and 77, corresponding to the indications (76) and (77) in the chart of FIG. 15, said closing being obtained before the transient closing of the switch 56. Consequently, the latter, when it closes, feeds the alarm circuit, while the lamp 92 is illuminated and the relay 88 is energized and opens the switch 90, so as to deenergize the motor 85.

Since the electromagnet 86 is now deenergized, the brake becomes operative and stops the motor. Generaly speaking, said stopping is not instantaneous, which allows the arms to rise and the switch to open. The switch 93 holds the alarm circuit energized and the feed circuit opened. When this occurs, the operator opens the switch 89, so as to deenergize the alarm circuit, after which he replaces the drill, if required, and reengages the main switch 89, so as to immediately restart operation.

Turning to the second embodiment, it distinguishes from the former through the mechanism which controls and times the movements of the movable members. It distinguishes therefrom, furthermore, by modifications of the clamping means and of its control mechanism, and by further modifications of the magazine, of its control mechanism and of the container of abrading material and through the incorporation of further arrangements such as cycle counting apparatus, means for manually controlling the rotation of the camshaft and an arrangement producing automatically the stoppage of the machine when the drill is worn to some extent. Otherwise, said second machine, apart from some detail modifications and a novel distribution of the component parts, is the same as the first-described machine; the references are the same for the same members in both machines, whether they have been modified or otherwise.

In particular, FIGS. 16 to 18 show the frame 20, the drilling mechanism 21, the magazine 22 which is of a modified structure, the stone-collecting container 23, the clamping means 24, the structure of which has also been modified, the conveyor arms 25 and 26, the headstock 27 and its spindle 32, the support 28, the piston 28a sliding inside the upright 29, the lever 30 cooperating with the piston 28a, the spindle 31, the shafts 39 and 40 carrying the conveyor arms, the pivot 96 to which is secured the lever 95 controlling the rotary movement of the shafts 39 and 40.

Said FIGS. 16 to 18 also show the stone-holding ports 25 and 26, the pump 51 with its double body 51a, the control lever 52 for said pump, pivotally secured to a spindle 31a parallel with the spindle 31, the control lever 68 for the clamping member which is also pivotally secured to said spindle 31a, the miniature switches 55 and 56, the strap 57, the container 58 for abrading material, the motor 85 driving the camshaft 78, through the agency of a transmission chain 180, the cams 79, 80, and 81 and 84 cooperating respectively with the control lever 52 for the pump 51, with the control lever 30 of the headstock 21, with the control lever 68 for the clamping member 24 and with the lever 95.

The control cam 82 of the first machine described hereinabove, which controls the vertical movements of the arms 25 and 26, is duplicated in the second machine; in other words, the vertical movements of said arms are controlled by two separate cams 82a and 82b cooperating respectively with two levers 45a and 45b pivotally secured to the spindle 31a. The cam 83 has been cut out, since the modified magazine 22 is no longer subjected to a rocking movement.

The rotary movement of the arms 25 and 26 is obtained starting from the cam 84, through the agency of a chain 100 secured, on the one hand, to the arm 95a of the lever and, on the other hand, to a coil spring 101 secured to the frame 20. Said chain meshes with two toothed wheels 102 and 103 rotating in unison with the shafts 39 and 40. It transmits to the arms 25 and 26 similar movements, the timing of which is defined by the cam 84.

The levers 45a and 45b act on the shafts 39 and 40 through the agency of two pusher members 104 and 105 guided by the uprights 106 and subjected to the action of the return springs 107.

The lever 30 is provided with an arm 30a which allows raising manually the headstock 27.

The machine according to the second embodiment includes means for manually shifting the camshaft 78. This arrangement, of which the control member is constituted by a lever 108 extending near the arm 30a, to the rear of the machine, includes a sleeve 109 revolvably carried by the camshaft and a free wheel coupling, which is not illustrated, inserted between the latter and said sleeve; said coupling is automatically disconnected when the shaft 78 is driven by the motor 85. Conversely, a free wheel coupling 190 disconnects the motor when the camshaft is driven manually.

The clamping means include, as shown in FIGS. 22 and 23, a rubber sleeve 110 provided with a flange 111 and inserted between the wall of a metal socket 112 and the end 113 of a reduced diameter of the carrier rod 60. The stone to be drilled is clamped in a recess 114 bounded by the bevelled surface of said end 113 of the rod 60 and the inner wall of the sleeve 110.

The opening of the clamping means is controlled by an apertured member 115 (FIG. 19) carried by a rod 116 to which the lever 68 communicates a vertical reciprocation.

During said movement, the edge of the member 115 engages the flange 111 and produces a downward bending of the latter which leads to a radial expansion of the walls on the recess 114 and allows the insertion and the removal of the stone (FIG. 23). When the clamping means are closed (FIG. 22), the wall of the recess 114 exerts on the stone a radial action associated with an axial pressure so that the stone is urged against the bottom of said recess and is held in the desired accurate position of its subsequent drilling.

As in the case of the first embodiment, the rod 60 is slidingly carried in a bearing 61 and rests through its lower end on a rocker 70 which imparts to it an axial reciprocation.

In order to retain the centering of elongated parts to be perforated, the clamping means 24 are driven into rotation by an electric motor 117 carried by the table of the machine, as illustrated in FIGS. 16 and 18, behind the upright 29. The shaft 117a of said motor is connected with the sleeve 110 by a belt 118 passing over two rollers 119 and over a pulley 120 revolving round the end of the rod 60, while a diaphragm 121 (FIG. 19) allows the clamping means to be shifted axially and ensures their drive through said sleeve 110.

The rocker 70 is subjected, as shown in FIG. 21, to the action of a spiral spring 122 which urges the rod 60 upwardly with the clamping means. Its movement is limited by impact on an adjustable switch 123 which plays the same part as the miniature switches 76 and 77 of the preceding embodiment.

The machine illustrated is provided furthermore, as already mentioned, with means controlling the wear of the drill. Said arrangement includes, as shown in FIGS. 19 to 21, a lever 124 carrying the contact-piece 125a of a switch 125 (FIG. 29), of which the other contact-piece 125b is rigid with the rocker 70. Under the action of the spring 124c, the lever 124 bears through its arm 124a against a movable stop 126 bearing in its turn against a ring 127 keyed to the shaft 40. Said ring is provided with a notch 127a into which the stop 126 collapses periodically and transiently before the actual boring procedure. During said transient engagement, the lever 124 moves downwardly and is held fast in a position which is accurately defined by a screw 128 and a stationary stop 129 (FIG. 21) for which the two contact-pieces 125a and 125b of the switch 125 are in contact before the drilling procedure begins when the rod 60 rises under the action of the rocker 70, as soon as the wear of the drill rises between a predetermined extent.

The magazine 22 of the machine which is illustrated in detail in FIGS. 24 to 27, includes a frame 130, the upper section of which is dished at 131 and is capped by a member of plastic material 132 provided with a cylindrical extension 132a inside which the stones to be drilled are introduced in bulk formation, while a rotary plate 133 keyed to a shaft 134 extending through the frame 130 carries at its lower end, a catch 170 and a toothed wheel 135, and an eccentric arrangement 136 allows adjusting the height of the space extending between the lower surface of the annular flange 132b of the capping member 132 and the upper surface of the plate 133. A glass sheet 132c cuts out the electrostatic action of the friction of the stone against the plastic material.

The annular flange 132b of the capping member 132 is provided with a notch 133 inside which is housed a narrow blade 138 provided along one of its edges with a V-shaped notch 139. The glass sheet 132c is provided with a metal guiding slope shown at 138a in FIG. 25.

The vertical shaft 134 is driven by the chain 100 through the agency of the toothed wheel 135 of a toothed gear 140 and of the catch 170 (FIG. 26) which transforms said alternating rotary movement of the chain into an intermittent rotary movement in an unvarying direction. Under the action of said intermittent movement of the shaft 134 and plate 133, the stones filling the cylinder 132b engage said plate flatwise and rise along the cam 138a, so as to engage individually the notch 139 (FIG. 27) out of which they are removed by the arm 25, so as to be conveyed into the clamping means.

As to the container 58 for the abrading material inside which the free end of the strap 57 dip periodically, it is driven into continuous rotation by the motor 117 through the agency of a transmission pulley 141 and of two belts 142 and 143.

The machine is also provided with a cycle-counting instrument 144 which is carried by the table of the machine underneath the cams. Said meter is actuated by a rocking rod 145 which, for each revolution of the shaft 79, rocks under the action of a stud 146 carried by the cam 82a.

The wiring diagram of the machine is illustrated in FIG. 28 and includes four circuits, to wit:

An A.C. one phase circuit of 220 volts feeding the motor 85.

A low-voltage control circuit operating under 48 volts and passing through the switches 55, 56, 123, 125, the two relays 146 and 147, of which the contact-pieces 146a and 147a are inserted in series in the circuit feeding the motor 85, a green witness lamp 148 and a red witness lamp 149.

An A.C. circuit operating under 10 volts and imparting a vibratory axial movement to the spindle and in which is inserted an adjusting rheostat 151.

A high-frequency A.C. circuit for feeding the motor driving the spindle.

These different circuits are controlled by a main switch 150 which makes or breaks simultaneously the circuit of the motor 85 and the low voltage circuit and by a switch 152 for the high frequency circuit.

The operation of the machine is illustrated by the chart of FIG. 29 which is executed in a manner similar to the chart of FIG. 15; the illustration is drawn however in a slightly different manner, in so far that the amplitudes of the movement may be read on the chart of FIG. 29. In said chart, the line A shows the condition of the clamping means; when said line registers with the horizontal reference line, the clamping means are closed, while they are open when the line A is located underneath the reference line.

The line B shows the angular movements of the carrier arms 25 and 26 to either side of the angular position in which said arms are shown in FIG. 16. The lines C25 and C26 illustrate the vertical movements to be executed by the arms 25 and 26 between their extreme positions defined by the two thin horizontal reference lines.

The line D illustrates the vertical movements of the headstock 27.

The line E shows the movements of the piston of the pump 51.

The line K shows the movement of the lever 124.

The short line P shows the drilling period.

The lines drawn in registry with the numerals 55, 56, 123 and 125 show the condition of the switches designated by said reference numbers for normal operation of the machine.

The lines drawn in registry with the numerals 123' and 125' show the condition of the switches 123 and 125 in the cases where the drill is worn or broken or when the clamping means carry no stone to be drilled.

The lines corresponding to the condition of the switches are drawn as interrupted lines when the corresponding switches 123 and 125 are open and when the switches 55 and 56 are in the positions drawn in dotted lines in FIG. 28. When the switches 123 and 125 are closed and the switches 55 and 56 lie in the positions illustrated in solid lines in said FIG. 28, the corresponding chart lines are drawn as solid lines.

The scale ranging between 0 and 360° shows at every moment the angular position of the camshaft executing one revolution per cycle.

The operation of the embodiment which has just been described is generally similar to that of the first machine and need not be discussed in full detail, except for the stage preceding the drilling operation during which the drilling conditions are controlled, such as the wear or breaking of the drill or the absence of any stone in the clamping means.

However, and in order to further the reading of FIGS. 28 and 29, the following explanations may be of interest:

In FIG. 28, the miniature switches 55 and 56 and the relays 146 and 147 are illustrated in their natural positions at the start.

At the starting of a cycle, the arms 25 and 26 lie in the angular positions which are those illustrated in plan view in FIG. 16. The arm 25 lies in its upper position and the arm 26 in its lower position. The switch 56 is closed by the latter.

The two arms engage simultaneously the stone to be drilled and the drilled stone respectively, while the camshaft lies between the angular positions at 70° and 105°. The actual positioning of the stones is slightly delayed and is obtained between 130 and 180°. In the meantime, the pump sucks or delivers, as the case may be, the air into and out of the stone-holding ports. The abrading material is laid over the stone during the period extending from 190° to 220°.

The machine is started by the closing of the switch 150 which energized the low frequency circuit. Current flows then through the winding of the relay 146, the miniature switch 56 lying in its lower position and the closed miniature switch 123. The lamp 148 is illuminated by the current passing through the central contact-piece controlled by the relay 147. The contact-piece 146a is also shifted, so as to close the circuit feeding the motor 85 which begins revolving. The lamp 149 remains in its non-illuminated condition. During a normal operative cycle, the motor 85 is energized uninterruptedly by the relay 146, of which the energization is ensured by the passage of current, either through the miniature switches 56 and 123 or else through the miniature switch 55 which closes at the moment at which the arm 26 moves away from its lower position.

The control stage begins at the moment at which the camshaft reaches its angular position at 280°. At said moment, the arm 26 is angularly held above the miniature switch 56. It sinks and urges transiently the movable contact-piece of the latter into its lowermost position. This has no action on the action of the operative cycle provided, during said period, the miniature switches 123 and 125 are open, as is normally the case.

In contradistinction, the relay 147 is energized and switches off the feed of the motor 85 if, during the first fraction (280 to 290°) of the period during which the miniature switch 56 is in its lower position, the movable contact-piece of the miniature switch 125 lying in its lower position, stops the rocker 70 because the drill is worn (see line 125' on the chart of FIG. 29) or else if, similarly, during the second fraction (290 to 300°), of the period referred to, the miniature switch 126 closes early because the drill is broken and consequently the rocker 70 has risen more quickly than under normal conditions (see line 123' on the chart of FIG. 29). When the motor 85 stops, the central contact-piece of the relay 147 opens the circuit of the lamp 148 which is thus extinguished and the lower contact-piece of said relay closes the circuit of the lamp 149 which is ignited. The last mentioned contact-piece holds the relay 147 in its energized condition if one of the miniature switches 56, 123 or 125 opens.

What I claim is:

1. An automatic machine for drilling a succession of parts of hard material, chiefly clockwork stones, comprising a magazine adapted to hold the parts to be drilled and provided with an output for said parts, a drilling mechanism including a headstock and a vertically shiftable drill-carrying spindle, a container collecting the drilled parts, clamping means registering vertically with the spindle and adapted to hold transiently the successive parts to be drilled, a first horizontal arm adapted to rock round a vetrical axis to remove a part out of the output of the magazine and to shift it angularly to convey it into the clamping means, a second horizontal arm adapted to rock round a vertical axis to remove the drilled part out of the clamping means and to shift it angularly to drop it into the container, a common control system shifting vertically and angularly both horizontal arms, and a mechanism controlling and adjusting the movements of said control system and of the drilling spindle to make the machine produce in successive stages in successive operative cycles the simultaneous transfer through the two horizontal arms respectively of a part to be drilled from the magazine to the clamping means to be drilled therein and of the precedingly drilled part from the clamping means into the collecting container.

2. An automatic machine for drilling a succession of parts of hard material, chiefly clockwork stones, comprising a magazine adapted to hold the parts to be drilled and provided with an output for said parts, a drilling mechanism including a headstock and a vertical vertically shiftable drill-carrying spindle, a container collecting the drilled parts, clamping means registering vertically with the spindle and adapted to hold transiently the successive parts to be drilled, said clamping means including a vertical vertically shiftable clamping rod, guiding means for said rod, means intermittently shifting said clamping rod downwardly, elastic jaws carried at the upper end of the clamping rod, means urging elastically said jaws apart when the clamping rod is located in a predetermined lower position, an auxiliary mechanism controlling the clamping means to make the clamping rod execute during one operative cycle a succession of axial movements and to make the jaws close and open again when the clamping rod is located in a predetermined upper position, a first horizontal arm adapted to rock round a vertical axis to remove a part out of the output of the magazine and to shift it angularly to convey it into the clamping jaws, a second horizontal arm adapted to rock round a vertical axis to remove the drilled part out of the clamping jaws and to shift it angularly to drop it into the container, a common control system shifting vertically and angularly both horizontal arms, and a mechanism controlling and adjusting the movements of said control system, auxiliary mechanism and drilling spindle to make the machine produce in successive stages in successive operative cycles the simultaneous transfer through the two horizontal arms respectively of a part to be drilled from the magazine to the clamping jaws to be drilled therein and of the precedingly drilled part from the clamping jaws into the collecting container.

3. In a machine as claimed in claim 2, means whereby the control mechanism is adapted to control the drilling operation while the drill-carrying spindle is vertically stationary and the rod carrying the clamping jaws is urged upwardly with the part to be drilled by the means acting constantly on said rod, the downwardly acting means being inoperative.

4. In a machine as claimed in claim 2, a jaw-guiding sleeve and means whereby the clamping jaws are urged apart by cooperating frusto-conical surfaces formed respectively on a fraction of the jaw-guiding sleeve and on the lower ends of the jaws.

5. In a machine as claimed in claim 2, a weight acting on the clamping rod and carried by one arm of a lever adjustable point of said arm.

6. In a machine as claimed in claim 2, the provision of a spring acting intermittently on the clamping rod to shift it downwardly.

7. In a machine as claimed in claim 2, the provision of means feeding the parts to be drilled when positioned in the clamping means with a drop of an abrading and lubricating substance.

8. In a machine as claimed in claim 2, the provision of a strap fitted on one of the horizontal arms, a container for an abrading and lubricating substance, and means dipping said strap once per cycle into the container to lay a drop thereof on the part to be drilled.

9. In a machine as claimed in claim 2, the provision of means driving automatically the parts to be drilled through and out of the magazine, to be taken hold of in succession by the cooperating horizontal arms.

10. In a machine as claimed in claim 2, the provision of means driving automatically the parts to be drilled through and out of the magazine, to be taken hold of in succession by the cooperating horizontal arm, and means whereby the control mechanism imparts a rocking movement to the magazine during the movement of the parts through the latter.

11. In a machine as claimed in claim 2, the provision of a motor, a single camshaft driven by said motor and controlling the different movements, except the rotary movement of the drilling spindle.

12. In a machine as claimed in claim 2, the provision of a motor, a single camshaft driven by said motor and controlling the different movements, except the rotary movement of the drilling spindle, and means producing automatically a stoppage of the motor whenever the cycle of operation executed differs from the normal programme.

13. In a machine as claimed in claim 2, the provision of a motor, a single camshaft driven by said motor and controlling the different movements, except the rotary movement of the drilling spindle, and an alarm circuit adapted to be released whenever the duration of drilling is shorter than a predetermined duration.

14. In a machine as claimed in claim 2, the provision of a motor, a single camshaft, a first cam on the camshaft, a lever controlled by said first cam, a chain secured at one end to said lever, a spring connecting the other end of the chain to a stationary point, two toothed wheels meshing with the chain, shafts rigidly carrying each a toothed wheel and a corresponding horizontal arm, and further cams on the camshaft controlling the movements of the other parts of the machine.

15. In a machine as claimed in claim 2, the provision of a motor, a camshaft controlled by said motor, a chain controlled by the camshaft, two toothed wheels meshing with the chain, shafts rigidly interconnecting each wheel with the corresponding horizontal arms, and further cams on the camshaft controlling the vertical movements of the clamping means and of the drilling spindle, the condition of the clamping means and the drilling periods.

16. In a machine as claimed in claim 2, the provision of a motor, a camshaft controlled by said motor, a chain controlled by the camshaft, two toothed wheels meshing with the chain, shafts rigidly interconnecting each wheel with the corresponding horizontal arms, stops defining the extent of the angular paths of the horizontal arms, and further cams on the camshaft controlling the vertical movements of the clamping means and of the drilling spindle, the condition of the clamping means and the drilling periods.

17. In a machine as claimed in claim 2, the provision of separate levers controlling respectively the angular and vertical movements of the two horizontal arms.

18. In a machine as claimed in claim 2, the provision of means for periodically checking the length of the drill, and means for stopping the operation of the machine as soon as the wear of the drill has reached a predetermined extent.

19. In a machine as claimed in claim 2, the provision of a cycle-counting apparatus.

20. In a machine as claimed in claim 2, the provision of a motor, a single camshaft driven by said motor and controlling the different movements except the rotary movement of the drilling spindle, and means for rotating by hand the camshaft.

References Cited in the file of this patent
UNITED STATES PATENTS

| | | |
|---|---|---|
| 2,398,251 | Robbins | Apr. 9, 1946 |
| 2,509,056 | Gartner | May 23, 1950 |
| 2,827,038 | Lefevre | Mar. 18, 1958 |